United States Patent

[11] 3,572,959

[72] Inventor William James Shaughnessy
Brookfield Center, Conn.
[21] Appl. No. 821,018
[22] Filed May 1, 1969
[45] Patented Mar. 30, 1971
[73] Assignee American Standard Inc.
New York, N.Y.

[54] COUPLING CONTROLLER
19 Claims, 8 Drawing Figs.
[52] U.S. Cl................................................ 415/30,
60/54, 91/366, 417/22, 60/Digest 2
[51] Int. Cl..................................................F01b 25/06,
F16d 33/14, F15b 13/16
[50] Field of Search............................................ 60/54, 52
(S.R.), 53 (W.E.R.) (Inquired), 12; 91/361, 362,
364, 366, (step-by-step); 192/.033; 103/35;
415/16, 30; 417/22, 42; 60/(G) (Digest 2); 91/429

[56] References Cited
UNITED STATES PATENTS

| | | | |
|---|---|---|---|
| 2,370,526 | 2/1945 | Doran........................ | 60/536 |
| 2,941,120 | 6/1960 | Harman et al. ............... | 103/35X |
| 3,187,510 | 6/1965 | Bunnelle..................... | 60/54 |
| 3,421,318 | 1/1969 | Falk ......................... | 91/366 |

*Primary Examiner*—Edgar W. Geoghegan
*Attorneys*—Jefferson Ehrlich, Tennes I. Erstad and Robert G. Crooks ABSTRACT: Covers equipment employing a sensor, such as a magnetic pickup, which senses the speed of the output shaft of a fluid drive apparatus, and determines whether the output shaft speed differs from a predetermined reference speed. If there is a difference or error, a correction signal is generated for correspondingly controlling the fluid drive apparatus to reduce the error signal, step by step, to a substantially zero magnitude. The correction signal, derived from the magnetic pickup which is spaced from but coupled to a gear device on the output shaft, is converted into a series of variable width pulses which are employed for the control function.

Load 10 may be a motor or pump
or conveyor belt or other
controlled device.

Patented March 30, 1971 3,572,959
6 Sheets-Sheet 1
Fig. 1.
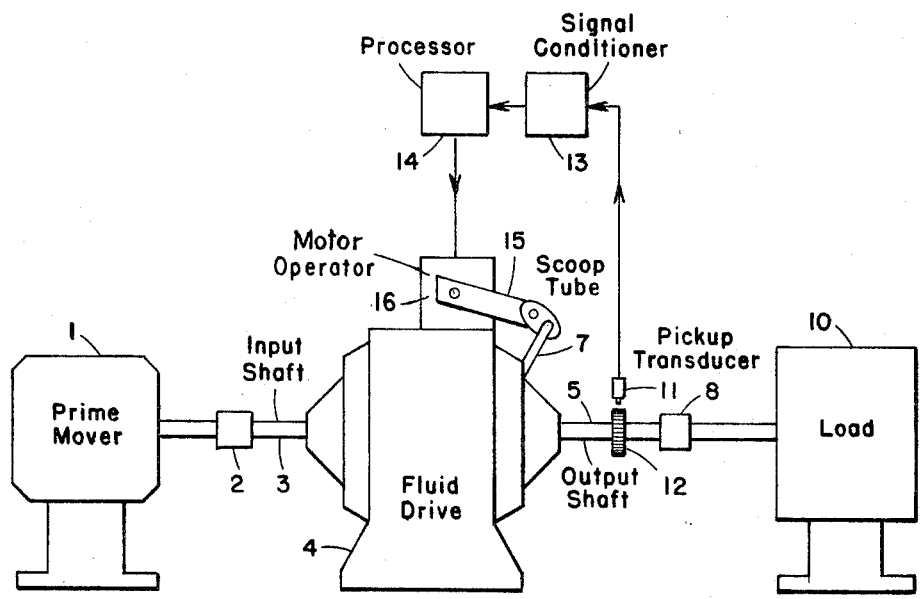
Load 10 may be a motor or pump or conveyor belt or other controlled device.
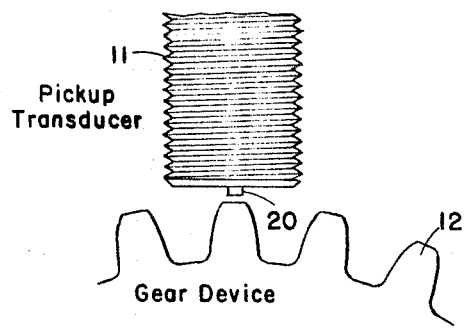
Fig. 2.
INVENTOR.
William J. Shaughnessy
BY *Jefferson Ehrlich*
ATTORNEY

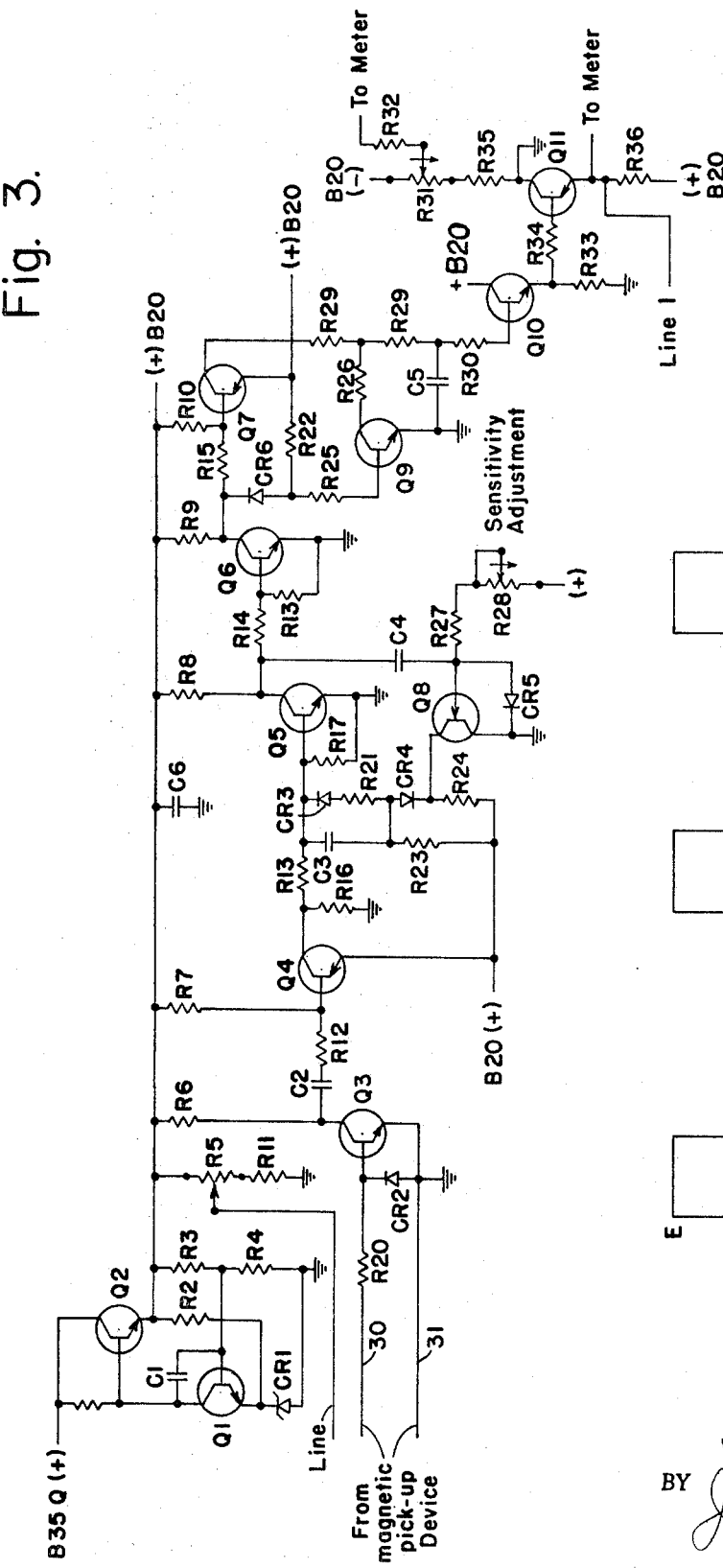

INVENTOR.
William J. Shaughnessy
BY Jefferson Ehrlich
ATTORNEY

INVENTOR.
William J. Shaughnessy
BY Jefferson Ehrlich
ATTORNEY

INVENTOR.
William J. Shaughnessy

COUPLING CONTROLLER

This invention generally relates to a method and apparatus of feedback control wherein the variable parameter of an apparatus or process, called the controlled variable, is maintained at or near a predetermined or preset value, this predetermined or preset value being hereinafter sometimes called the "set point." This is accomplished by measuring the value of the controlled variable and comparing this value with the set point value, then generating a signal proportional to the difference between the two values, and using the difference signal to modify some phase of operation of the apparatus or process so that the value of the controlled variable will be returned very closely to the set point value.

In particular, this invention relates to a control system employing a translating device, hereinafter called the "processor," which compares a signal corresponding to a controlled variable of the system with the signal corresponding to the set point and operates on the difference between these two signals or values, this difference being the "error" signal. The control system operates in such a way as to modify some phase of the process or apparatus so that the difference between the signal corresponding to the value of the controlled variable and the signal corresponding to the set point value, that is, the error signal, will actuate apparatus to reduce the error signal to near zero.

More particularly, this invention relates to a speed control system employing a processor as described above which is used in conjunction with a reversible motor operator as, for example, the type 904F motor operator manufactured by the HONEYWELL Corporation. The motor operator furnishes the mechanical power to modify a significant phase of the process or apparatus in question in order to obtain the desired control of the speed. In addition to the above, the processor employs a translating device to which is applied a first signal corresponding to the value of the controlled variable and another signal corresponding to the value of the set point, both signals being supplied as inputs to the translating device. The motor operator is, in turn, controlled by the output of the translating device. The processor operates on the input signals so that, when a significant difference or error signal exists, the motor operator is caused to operate in such a way that it will, step by step, cause some phase of the process to be modified so that the difference or error signal is reduced substantially to zero.

This invention may be employed, for example, in connection with any well-known fluid drive of the variable speed type which is typically used as a coupler or transmission medium between a fixed speed rotating power source, such as an induction motor, and a rotating shaft-powered load which is to be driven at variable speeds or slowly accelerated or decelerated to a fixed or predetermined speed. One form of such a fluid drive is commercially available as the "VS2 Gyrol Fluid Drive." In such a mechanism power transmission in the fluid drive is achieved through a variable coupling between the driving member, sometimes called the impeller, and a driven member, sometimes called the runner. By regulating the quantity of fluid inserted in to the rotating vortex of the fluid drive which couples the impeller with the runner, the output shaft speed can be varied over a wide range. The quantity of fluid in the coupling vortex may be controlled by adjusting the position of an open-ended scoop tube located within the vortex of the fluid drive. The fluid, which may be continuously fed to the vortex chamber by a pump coupled to the input shaft, is returned to the reservoir of the fluid drive through the scoop tube. The relative position of the end of the scoop tube within the vortex determines the steady state level of fluid in the coupling apparatus and thus determines the amount of energy transferred to the output shaft.

This invention will be better understood from the more detailed description and explanation hereinafter following when read in connection with the accompanying drawing in which:

FIG. 1 illustrates a schematic diagram of the main components of the speed control system that may be employed in practicing the invention;

FIG. 2 shows a form of pick up or transducer arrangement that may be employed in this invention to obtain pulses so as to sense the speed of the output shaft of the fluid-coupling apparatus;

FIG. 3 illustrates a conditioning arrangement for averaging the pulses obtained by the pickup or transducer arrangement and producing an equivalent voltage;

FIG. 4 shows a group of pulses developed by the apparatus of this invention;

Figure 5:
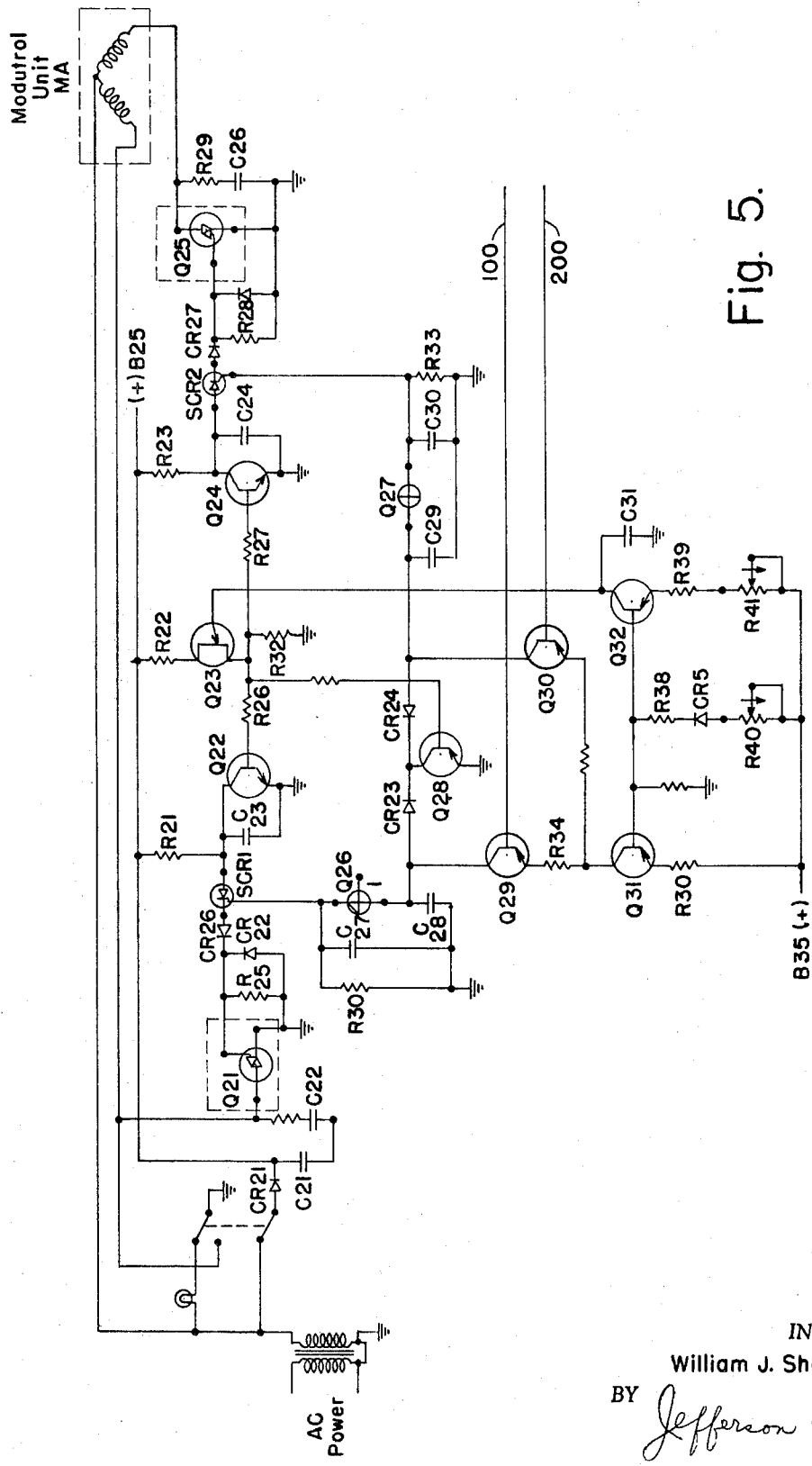
FIG. 5 shows a processing arrangement responsive to the current developed by the conditioning arrangement of FIG. 3 for producing corresponding groups of pulses.

FIG. 1 schematically depicts one application of the invention in which a rotating shaft-powered mechanical load 10, as, for example, a conveyor belt, is to be driven at a constant speed, the value of which may be selected at will be an operator. The equipment involves a prime mover 1, for example, an electric motor or gasoline engine operating at a nearly constant speed, which is coupled, through a coupler 2, to the input shaft 3 of the inter coupling transmission element or fluid drive 4. The output shaft 5 of this transmission element 4 which may be, for example, a fluid drive product manufactured by the assignee of this application and known as a Gyrol Fluid Drive, or that apparatus shown and described in the R. M. Nelden U.S. Pat. No. 3,096,620, issued Jul. 9, 1963, entitled "Fluid Drive Improvement," assigned to the same assignee, may be set at or below the speed of the input shaft 3 by manipulating the position of a control rod 7, sometimes called the scoop tube, of the fluid drive machine 4, as will be explained. The speed of the output shaft 5 is a function of load 10 as well as of the position of the scoop tube 7 of element 4. If the load 10 on the output shaft increases, the output shaft speed will decrease. Similarly, if the load on the output shaft 5 decreases, the shaft speed will increase but never to a value greater than, for example, about 97 percent of the input shaft speed. By repositioning the scoop tube 7 in the coupling vortex of the fluid drive machine 4 following a load change, the output shaft speed can be maintained at a nearly constant value thereby to maintain the speed at substantially constant value.

A feedback control system which automatically regulates the speed of the output shaft 5 is one of the key components of this invention. The output shaft speed is measured by a suitable transducer 11 which is coupled to a gear or gearlike disc 12, as shown in FIG. 2. The electrical signal supplied by the transducer 11, which corresponds to the shaft speed is fed to a signal conditioner 13.

In this particular embodiment for illustration, the transducer may be a magnetic pickup, such as an ELECTRO model 3030-AN, and it is located in close proximity to the gear or gearlike disc 12 which is mounted on the output shaft 5 of the fluid drive transmission equipment 4. This combination of the transducer 11 and the gear device 12 provides a means for sensing the output shaft speed. The transducer 11 by being coupled to gear device 12, supplies a series of pulses, the frequency or repetition rate of which is directly proportional to the output shaft speed. The pulses are fed to the signal conditioner 13 which converts the pulses picked up by transducer 11 into a substantially continuous voltage (or current). The change in the magnitude of the continuous voltage is directly and linearly proportional to the frequency or repetition rate of the incoming pulses due to the teeth of the gear device 12.

A schematic circuit of the signal conditioner circuit employed to obtain the continuous voltage just referred to for use in the speed control system embodiment of this invention is shown in FIG. 3. The speed of the output shaft 5 of FIG. 1 is measured as a pulse rate frequency by the electromagnetic pickup 11, which is generally shown in FIGS. 1 and 2. The sensing tip 20 of the electromagnetic pickup 11 is physically spaced with respect to the outer diameter of the gear or sprocket wheel 12, which is mounted on the output shaft 5, as shown in FIG. 2. As each of the gear teeth passes the tip 20 of the pickup 11, the change in magnetic field of the pickup device 11 induces a voltage in a coil (not shown) contained within the body of the pickup device 11. Thus, a gear 12 with 48 teeth will produce a train of pulses at a frequency $f$ where $$f = 48 \frac{n}{60}$$

and $f$ is measured in cycles per second and $n$ speed of shaft 5 in r.p.m.

The signal conditioner equipment of FIG. 3 accepts the pulses from the magnetic pickup 11 in conductors 30 and 31 and produces a DC output voltage signal which is directly and linearly proportional to the frequency of the incoming pulses as already mentioned. This frequency-to-voltage conversion is realized by generating a pulse of precise amplitude and time duration for each of the irregularly shaped pulses generated by the magnetic pickup 11 and then measuring the average DC value of such pulses over any given period of time.

The general technique of measuring the average DC value of the pulses is illustrated in FIG. 4. Pulses are generated within the signal conditioner of FIG. 3 each of which has an amplitude such as E and a time duration such as $T_1$, as shown in FIG. 4. The average value of this periodic waveform is $$V_{ave} = \frac{ET_1}{T}$$

But the time interval of the pulse, which is caused by one tooth of the gear device 12, is $T=1/f$. Therefore, the average value of the waveform shown in FIG. 4 is $V_{ave}=Eft_1$.

As will be explained, pulses of the precise time duration shown in FIG. 4 are produced by a monostable multivibrator circuit incorporated in the signal conditioner of FIG. 3. The incoming pulses from pickup 11 are applied through conductors 30, 31 to the base and the grounded emitter of transistor Q3. As soon as the incoming pulse signal from the pickup device 11 goes positive, transistor Q3 is driven into saturation and remains in that state until the incoming pulse signal level from pickup device 11 falls below zero. A square wave is thus produced at the collector of transistor Q3. The negative going edge of the square wave is transformed into a negative pulse by capacitor C2 and resistor R12 of FIG. 3. The negative pulse is applied to the base of transistor Q4 producing a positive pulse at the collector of transistor Q4. This positive pulse then is applied to the base of transistor Q5 through R13, thereby triggering the monostable multivibrator of FIG. 3.

Figure 7:
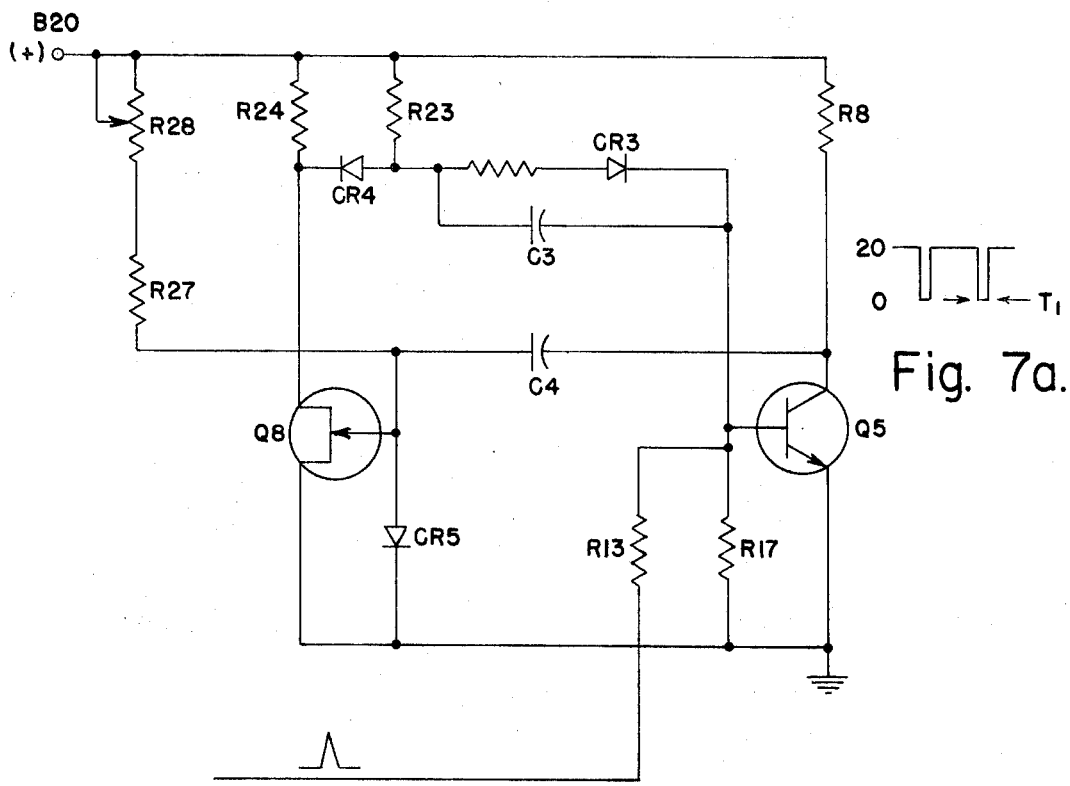
FIG. 7 shows a monostable vibrator which is embodied in the conditioning circuit of FIG. 3.

The multivibrator portion of the signal conditioner of FIG. 3 has been redrawn in FIG. 7 for greater clarity. The multivibrator circuit operates, in response to the positive pulse from the collector of transistor Q4, to produce at the collector of transistor Q5 a negative rectangular pulse having a time duration proportional to the product of the capacitance of capacitor C4 and the resistances of resistor R27 and that portion of resistor R28 not bypassed by its wiper, said capacitor and resistors being connected to the collector of transistor Q5 as shown in FIGS. 3 and 7. The negative rectangular pulse is shown in FIG. 7a. Potentiometer R28 is adjustable so as to set the multivibrator pulse period which controls the basic sensitivity of the signal conditioner of FIG. 3 in volts per cycle.

The multivibrator pulses produced at the controller of transistor Q5, which are shown in FIG. 7a, as already noted, are inverted by transistor Q6 and then applied to a push-pull driver circuit employing PNP transistor Q7 and NPN transistor Q9. This push-pull driver circuit of FIG. 3 has been redrawn in FIG. 8 for greater clarity. The output of the push-pull driver circuit is applied to an integrating circuit comprised of resistor R29 and capacitor C5. Wit no input pulse signal applied to line 30, 31 extending to the signal conditioner, that is, at zero speed of the output shaft 5, transistors Q6 and Q7 are continuously saturated. The voltage on capacitor C5 under this condition is nearly equal to the DC voltage B20. When a pulse signal derived from the magnetic pickup 11 is present, however, a train of positive pulses of precise width $T_1$ (see FIG. 7a) and having a magnitude of about B20 volts will traverse resistor R14 and will appear at the collector of transistor Q6. For the duration of each of these pulses, transistor Q9 will be in saturation and capacitor C5 will therefore discharge through the collector-emitter circuit of transistor Q9 toward ground potential. The resultant average voltage on capacitor C5 may be obtained from the expression:

$$V_{ave} = 20(1 - fT_1)$$

Figure 8:
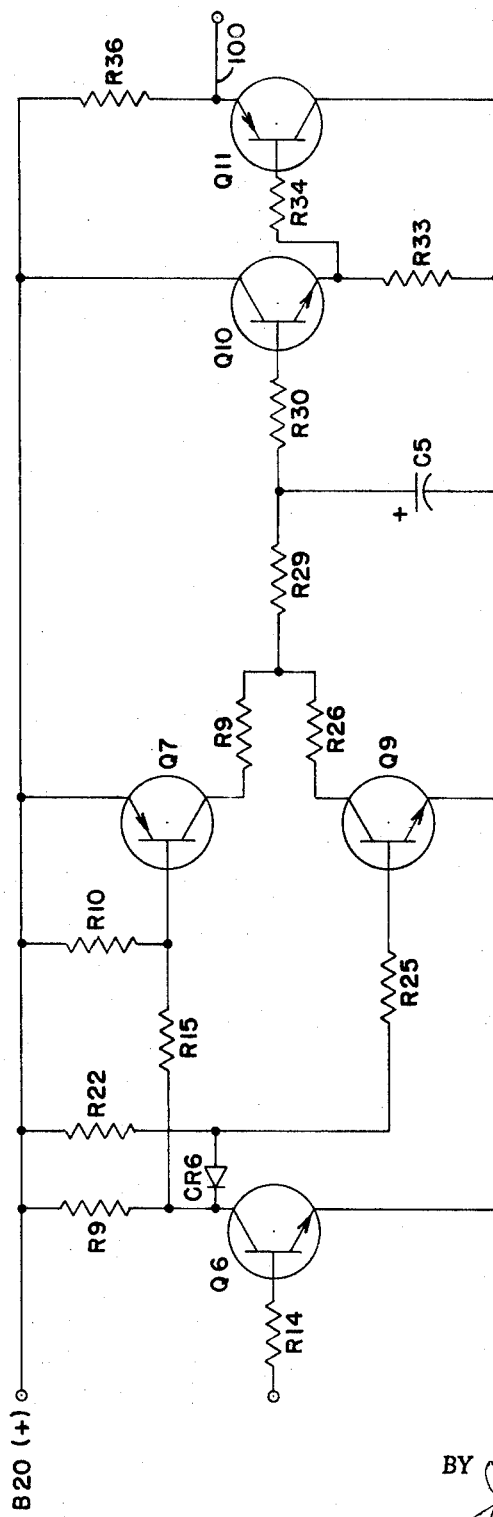
FIG. 8 shows a push-pull integrator circuit which is another part of the conditioning circuit of FIG. 3.

The voltage on capacitor C5 is applied to a series pair of emitter-followers Q10 and Q11 shown in FIGS. 3 and 8. The NPN-PNP emitter-follower combination of transistors Q10 and Q11 reduces the offset to near zero because the base-emitter voltage drops of the two transistors Q10 and Q11 are in series opposition. This series opposition connection also reduces the temperature sensitivity of the circuit. The output signal from the emitter of transistor Q11 is directly connected by conductor 100 to the base of transistor Q9 in the processor of FIG. 5.

The continuous output signal from the signal conditioner 13 (see FIG. 1) is applied to the processor circuit 14 which, as already noted, is another important part of the invention and will be described in connection with FIG. 5. Included in the signal conditioner of FIG. 3 is the set point adjustment resistor R5. As already noted, this set point adjustment determines the reference voltage level which is to be compared with the input signal. The difference between the reference voltage level and the input signal is called the error signal as already indicated above.

In response to a continuous error signal, the processor 14 (see FIG. 1) controls the conduction duty cycle of two solid state AC switches, i.e., thyristor switches Q21 and Q25 of FIG. 5, to be subsequently described with reference to FIG. 5, and these switches may be included as part of the processor 14. The AC switches (Q21 and Q25) are connected to each of the two control windings of a different type of motor operator MA (which is designated 16 in FIG. 1). This motor operator, for example, may be a HONEYWELL model 904F Modutrol unit. Depending upon the polarity of the error signal or signal pulses, one or the other of the two AC switches Q21 or Q25 will be selectively pulsed. The ratio of the ON time (when the selected switch is conducting) to the total ON plus OFF time is directly related to the magnitude of the error signal. The crank arm 15 of the motor operator 16 (see FIG. 1) moves during the time that the selected AC switch in the processor is ON or conducting. The direction of motion of the crank arm 15 depends on which of the two AC switches (Q21 or Q25) in the processor is conducting. Both switches cannot conduct simultaneously. The crank arm 15 of the motor operator 4 is connected to the scoop tube 7, as shown in FIG. 1, so that the scoop tube 7 is moved in discrete increments becoming smaller as the error magnitude is reduced. Because of the slow response of the fluid drive of the motor operator 4, these discrete steps are actually translated into a relatively smooth transition in speed of the output shaft 5 of FIG. 1.

The mode of control, in which the final control element (i.e. motor operator 4) is pulsed step by step rather than driven continuously, may be called "time proportional control." This mode of control is especially suited to apparatus and processes characterized by a dead time and a slow rate of response. The scoop tube 7 of the fluid drive, rather than being continuously moved at a fixed rate when an error signal is present, is moved in incremental steps. The effect is that the control action "stops and waits" for the slowly responding process to "catch up." This results in a control system which is quite accurate and dynamically stable without overshooting and without excessive slowness in responding to an error signal and which is also free from offset. This invention achieves these goals through an electronic circuit which is novel in design and low in cost.

The schematic circuit for the time-proportional control processor 14 of FIG. 1 (or controller) is shown in some detail in FIG. 5. Three capacitors, C28, C29 and C31 begin charging at the same time, each from a separate current source. Capacitor C28 is charged with the collector current of transistor Q29 which receives current from source B28 of FIG. 3; capacitor C29 is charged with the collector current of transistor Q30 which receives current from source B28; and capacitor C31 is charged with the collector current of transistor Q32 which receives current from source B31. Transistor Q28 is turned off during the charging period.

If the voltage from the emitter of transistor Q11 of FIG. 3 (which corresponds to the voltage from the signal conditioner 13 of FIG. 1) applied to the base of transistor Q29 substantially equals the reference voltage applied through conductor 100 (see FIG. 3) to the base of transistor Q30, that is, if the error voltage is zero, the collector currents of transistor Q29 and transistor Q30 will be substantially equal. Capacitors C28 and C29 of FIG. 5 will then charge at about the same rate. The biasing potentiometers R20 and R21 are adjusted such that, under this condition, the voltage on capacitor C31 will reach the firing level of unijunction transistor Q23 before the voltage on either capacitor C28 or capacitor C29 reaches the firing level of the silicon unilateral switches (SUS) Q26 or Q27 to which they are respectively connected. When the unijunction transistor Q23 fires, however, current is injected into the base of transistor Q28 through resistor R31, rendering transistor Q28 conductive. Transistor Q28 is thus turned on so that both capacitors C28 and C29 are rapidly discharged through the collector-emitter circuit of transistor Q28. When the emitter current of unijunction transistor Q23 decays sufficiently, this transistor Q23 will turn off and capacitors C28, C29 and C31 will one again begin charging. This cycle will repeat continuously.

The cycle time or repetition rate is regulated by adjustment of potentiometer R40 which controls the amplitude of all three charging currents. Potentiometer R41 is included to allow introduction of a deadband into the control circuit so that, if desired, no corrective action will take place until the error signal exceeds some preset amplitude.

If a sufficient voltage difference appears across the bases of transistor Q29 and transistor Q30, the differential amplifier action of transistor Q29 and transistor Q30 will result in a current unbalance in the collectors of these transistors. If the voltage on the base of transistor Q29, for example, falls below that on the base of transistor Q30, as would be the case if the speed of the output shaft 5 (see FIG. 1) dropped below the set point, the collector current in transistor Q29 would increase while the collector current in transistor Q30 would decrease by the same amount. If the difference is great enough, the voltage on capacitor C28 would reach the firing level of transistor Q26 before the voltage on capacitor C31 would reach the firing level of unijunction transistor Q23. When transistor Q26 fires, rectifier SCR1 will be turned on, allowing current to flow through resistor R21 and into the gate of thyristor Q21. Thyristor Q21 is a solid-state AC switch connected between one of the two coils of the motor operator MA, the final control element, and the common terminal of both coils of device MA. As long as thyristor Q21 remains turned on, the motor operator MA will be driven in a counterclockwise direction.

Thyristor Q21 will remain turned on until capacitor C31 reaches the firing level of transistor Q23. When unijunction transistor Q23 fires, it promptly removes whatever charge remains on capacitor C28 and capacitor C29 as described earlier, and also turns on transistors Q23 and Q24. When transistor Q23 and transistor Q24 are turned on, the anodes of devices SCR1 and SCR2 are effectively grounded so that whichever of the two may have been conducting will be turned off. In this example, device SCR1 and, consequently, transistor Q21 will both be turned off. The greater the unbalance in the collector currents of transistor Q29 and transistor Q30, the earlier will transistor Q26 fire and thyristor Q21 will be turned on and the greater will be the duty cycle.

Figure 6:
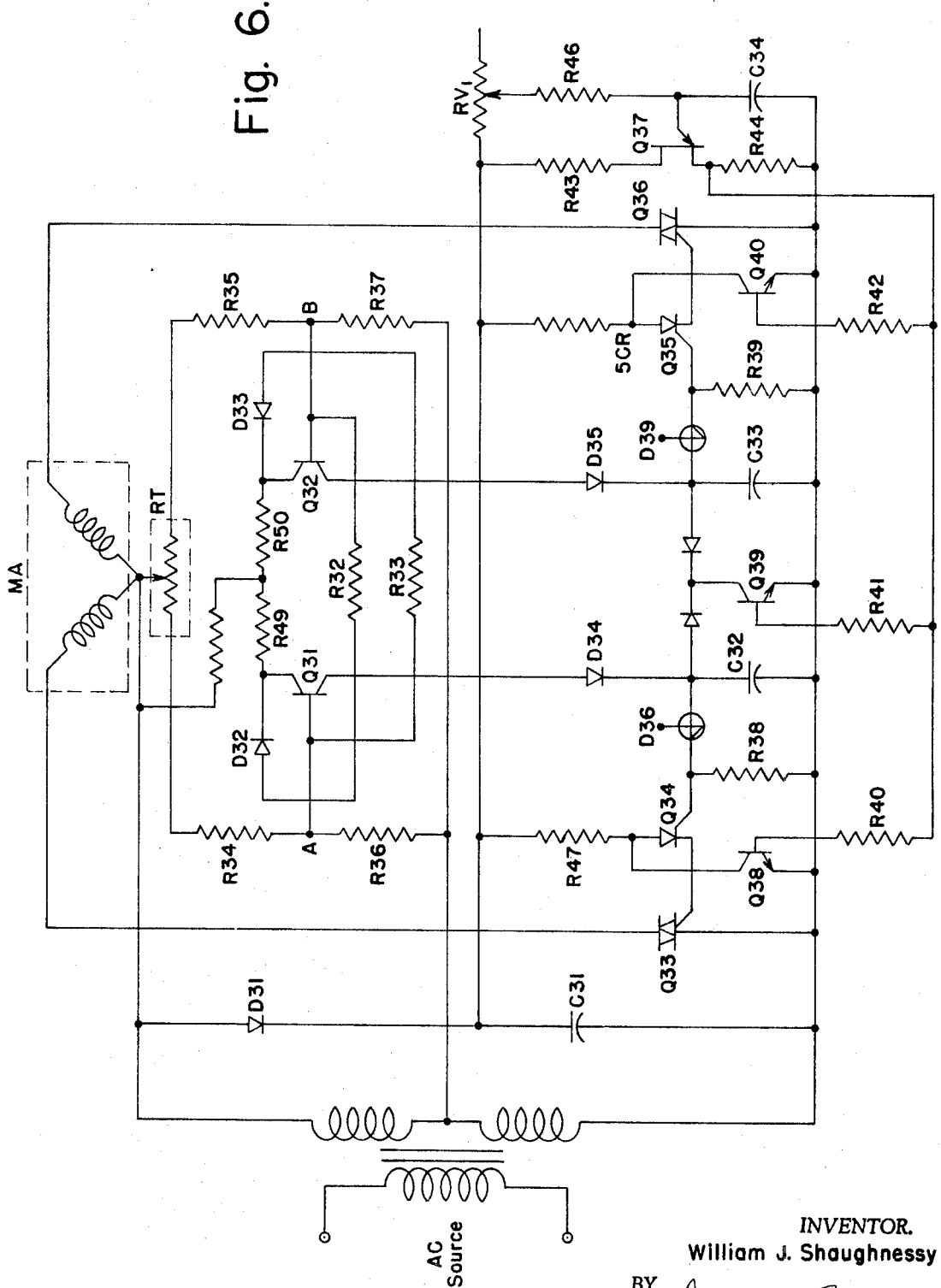
FIG. 6 shows the equipment which is coupled to the processing arrangement of FIG. 5 to control the operation of an actuator.

The embodiment of the controller circuit for actuating the motor operator 16 of FIG. 1 is shown in FIG. 6 and is intended to supplement the circuit of FIG. 5 and its description. The controller includes three capacitor-charging circuits, each having a level-sensitive triggering device which operates either on a thyristor network or a reset network. The capacitor-charging circuit formed by resistor R46, resistor RV1 and capacitor 34 determines the cycle period, T. This section of the controller derives its operating voltage from capacitor C31. When the voltage across capacitor C34 reaches the firing level of unijunction transistor Q37, a pulse is transmitted to the base of transistors Q38, Q39 and Q40 through resistors R40, R41 and R42. Thus, the three transistors are momentarily driven into saturation. When transistor Q39 saturates, any charge accumulated on either capacitor C32 or capacitor C33 is removed, reducing the voltage on both capacitors to a level near zero. Transistors Q38 and Q40 divert current from the anodes of switching transistors Q34 and Q35, causing these two devices to be turned off if either of them had been previously turned on. Thus, thyristors Q33 and Q36 will also be turned off if either had been previously turned on.

After the reset pulse from Q37 decays (a few milliseconds), capacitors C32 and C33 will begin to charge because of current flow from the collectors of transistors Q31 and Q32. If the potentiometric transducer RT is in such a position that the voltage from terminals A to B remains nearly zero throughout the AC voltage cycle, then capacitors C33 and C32 will charge at nearly equal rates. The circuit components are selected so that, under this condition, the unijunction transistor Q37 will fire, discharging capacitors C32 and C33, before the voltage level on either capacitor C32 or capacitor C33 builds up to a level sufficient to breakdown device D6 or device D9 which may be silicon unilateral switches.

As the wiper of the potentiometric transducer RT of the motor operator moves a sufficient amount from the position at which the currents from the collector of transistor Q31 and Q32 are nearly equal, the currents flowing from the collectors of transistors Q31 and Q32 will become increasingly unequal or unbalanced. If the wiper moves to the left, current from the collector of transistor Q32 will increase while current from the collector of transistor Q31 will decrease; if the wiper moves to the right current from the collector of transistor Q31 will increase while current from the collector of transistor Q32 will decrease.

Note that in all cases, current flows from the collectors of transistors Q31 and Q32 only when the voltage at the upper terminal (as shown in the FIG.) of the transformer secondary is positive with respect to the lower terminal.

As collector current of either transistor Q31 or transistor Q32 increases, the rate at which charge is accumulated on the associated capacitor (C32 or C33) will increase until finally the voltage on capacitor C32 or C33 reaches the triggering level of device D36 or device D39 respectively before the voltage on capacitor C34 reaches the triggering level of transistor Q37.

When, for example, the motion of the wiper is to the right, the voltage on capacitor C32 will eventually reach the triggering level of device D36 before the voltage on capacitor C34 reaches the triggering level of transistor Q37. When this level is reached, device D36 breaks down, transmitting a positive current pulse to the gate of SCR device Q34. Device Q34 will then turn on and remain turned on because of a continuous flow of current from anode to cathode through resistor R47 and the gate-anode terminals of thyristor Q33. The continuous current flow through the gate-anode terminals of the bidirectional thyristor Q33 will maintain a low-impedance conduction path from anode 1 to anode 2 of that device. The resulting flow of current through the energized actuator coil will cause the actuator to move continuously in one direction. Devices Q34 and Q33 will continue to remain turned on only until unijunction transistor Q37 fires, at which time transistor Q38 saturates, interrupting the flow of current through device Q34. Device Q34 will then turn off and remain turned off. The absence of current flow into the gate of thyristor device Q33 will cause that device to be turned off within a half cycle.

If the motion of the wiper were to the left, device D9 would have fired, initiating the same sequence of events just described but with respect to devices Q35, Q36 and Q40 rather than devices Q33, Q34 and Q38. Motion of the actuator would then have been in the reverse direction.

The greater the departure of the wiper of $R_T$ from the balance position, the greater will be the unbalance of the collector currents of transistors Q31 and Q32 and the earlier in the cycle will occur the triggering of devices D6 and D9. Thus, the duty cycle, i.e., the percentage of each cycle that the actuator is in motion, will increase as the amount of departure of the potentiometer wiper from position at balance.

It is apparent, then, that by proper phasing of the response of the actuator with transducer motion, a closed loop control system can be effected.

Because of the nature of the circuit formed by transistors Q31, Q32, resistors R31, R32 and R33, the increase in current flow into either capacitor C32 or capacitor C33 in response to maximum potentiometer wiper travel will not exceed more than about 1.6 times the value at balance. This limits the maximum duty cycle to about 50 percent.

Thus, the invention provides an arrangement for controlling a coupler 4—which may be a fluid drive coupler—interposed between a source of power and a load to be driven by the power source. The control arrangement embodies a feedback system, as is plainly shown in FIG. 1. The feedback system is in the form of a loop interconnecting or coupling the output shaft 5 with the coupler mechanism 4. The transducer 11 senses and monitors the output shaft 5 and generates a series of pulses the number of which is proportional to the speed of shaft 5, i.e. the operating property or parameter of the load. These pulses are converted by equipment 13 to a continuous voltage, for example, which is proportional to the received sensing pulses. The so-called processor 14 compares the continuous voltage produced by equipment 13 with a datum or reference signal in the form of another voltage which corresponds to the predetermined setting for the coupler 4. The difference between the two voltages—sometimes called the error signal—generates another series of pulses in the processor 14 which are poled and employed for controlling, step by step, the operation of the motor operator 16. The control of the coupler 4 is performed in discrete steps or increments in order to move a mechanical element, coupled to the motor operator 16, the mechanical element being a scoop tube in the fluid drive 4. The scoop tube 7 controls the vortex flow of the drive 4 to return the output shaft 5 to its speed at the set point, i.e., the predetermined speed, without overreacting to or overshooting shaft speed changes. The movement of the scoop tube is accomplished by the modutrol unit 16 (MA) which is, in effect, the final control element. The steps become smaller and smaller until the set point is reached.

Although this invention has been shown and described as applicable to the control of the speed of any form of load, such as a conveyor system, the invention will be equally applicable to the control of the pressure of fluid delivered by a variable speed pump, such as a centrifugal pump. The pressure control system of this invention may be used, for example, in applications where the pump discharge pressure is the desired controlled variable. In systems of this type, the output shaft 5 of the fluid drive 4 may be coupled, by any well-known means, to a centrifugal pump which may be considered as the load 10. It is the object of the pressure control system to maintain the pump discharge pressure substantially constant by automatically adjusting the pump shaft speed in accordance with the varying pressure of the fluid system. If the pump discharge pressure were, for example, to drop because of a demand for an increased flow rate in the fluid system supplied by the pump, the pressure control system should respond by withdrawing the fluid drive scoop tube 7 until the operating speed of the pump, which is coupled to the output shaft 5 of the fluid drive 4, increases to a rate sufficient to maintain the desired pump pressure substantially constant. This could be readily accomplished by replacing the gear mechanism 12 and the transducer 11 by any well-known pressure sensor responsive to changes in the fluid pressure under control and having the pressure sensor, in turn, control an appropriate signal conditioner. This will control the processor 14 so as to control, step by step, the equipment leading to the scoop tube 7. These variants would be apparent to those skilled in the art who are familiar with this invention.

While this invention has been shown and described in certain particular embodiments for explanation and illustration, it will be apparent that the invention may be embodied in many other widely varied organizations without deprecating from the spirit and scope of the inventive concepts set forth in this disclosure.

I claim:

1. Control apparatus for a fluid drive coupled to a load, comprising means for changing the coupling of the fluid drive step by step as the magnitude of the load changes from a predetermined value to return the load to said predetermined value said means comprising means coupled to said fluid drive and responsive to changes in the magnitude of the load to produce pulses of a magnitude corresponding to the changes in the load magnitude for maintaining substantially constant the power supplied through the fluid drive to the load.

2. Control apparatus for a fluid drive coupled to a load, comprising means for changing the coupling of the fluid drive step by step as the magnitude of the load changes from a predetermined value to return the load to said predetermined value, said means comprising an electromagnetic structure having a controlled moving element which changes the rotating vortex of the fluid drive step by step to change the power delivered to the load.

3. Control apparatus for a fluid drive coupled to a load according to claim 2, in which the coupling changing means generates pulses of a magnitude and polarity which are responsive to load changes, and means responsive to said pulses to vary the rotating vortex of the fluid drive step by step.

4. Control apparatus for a moving load comprising a fluid drive coupled to the load by a shaft, means responsive to the speed of the shaft to generate a first plurality of pulses, means responsive to said first plurality of pulses to produce a second plurality of pulses corresponding to changes required to return the power developed by the load to a predetermined value, and means responsive to the second plurality of pulses to change the rotating vortex of the fluid drive step by step.

5. Control apparatus for a moving load according to claim 4 in which the means for generating the first plurality of pulses comprises a toothed gear and a coil coupled to said gear, the magnetic field of which changes as the rate at which the teeth of the gear move past said coil.

6. Control apparatus for a moving load according to claim 4 in which the means responsive to the second plurality of pulses comprises an electromagnetic structure having an armature which moves in one direction to change the rotating vortex in one direction and which moves in the opposite direction to change the rotating vortex in the opposite direction.

7. Apparatus for controlling a power-supplied load comprising a drive coupled between the power source and the load, sensing means for producing a first plurality of pulses corresponding to changes in the operating property of the load, means for converting said first plurality of pulses to a continuous voltage representation of said pulses, means responsive to the difference between the continuous voltage and a predetermined magnitude to produce a second plurality of pulses which are poled to correspond to the directional change to be made in the operating property of the load, and means responsive to said second plurality of pulses to directionally change the operating property of the load.

8. Apparatus for controlling a power-supplied load according to claim 7 in which the sensing means comprises a rotating mechanical gear coupled to the load and a magnetic detector adjacent to the teeth of the gear to generate pulses as the gear rotates.

9. Apparatus for controlling a power-supplied load according to claim 7 in which the means responsive to the second plurality of pulses is an electromagnetic structure having a controlled moving element which changes the coupling of the drive.

10. Apparatus for controlling a load comprising a fluid drive which is coupled to the load by a rotatable shaft, a gear mounted on said shaft, a coil juxtaposed to said gear and producing a first group of pulses corresponding to the changes in the speed of said gear, means for integrating said first group of pulses into a continuous voltage, a comparator for comparing said continuous voltage with a predetermined voltage, means responsive to the departure of the continuous voltage from the predetermined voltage to generate a second plurality of pulses, and an electromagnetic structure having a moving element to change the rotating vortex of the fluid drive according to said second plurality of pulses.

11. Apparatus for controlling a load according to claim 10, in which said predetermined voltage is adjustable to correspond to the predetermined operating property of said load.

12. Apparatus for controlling a load according to claim 10, in which the moving element of the electromagnetic structure is operated step by step to correspondingly change the rotating vortex of the fluid drive.

13. Apparatus for controlling a load according to claim 12, in which the moving element of the electromagnetic structure is mechanically coupled to a device for physically changing the rotating vortex of the fluid drive.

14. Apparatus for controlling the changing operating property of a load, comprising a fluid drive coupled to the load by a rotatable shaft, means responsive to changes in the speed of said shaft to produce a continuous voltage corresponding to said changes in said speed, means responsive to said continuous voltage to generate pulsations of a magnitude and polarity corresponding to the departure of the operating property of said load from a predetermined value, and means responsive to said pulsations to change the rotating vortex of said drive step by step to return said operating property of said load to said predetermined value.

15. Apparatus for controlling the changing operating property of a load according to claim 14 in which the means to change the rotating vortex includes an electromechanical element coupled to a device for physically changing the rotating vortex of the fluid drive.

16. Apparatus for controlling a variable pressure load comprising a fluid drive which is coupled to said load by a rotatable shaft, pressure-sensitive means electrically coupled to said fluid drive and said load and producing pulses responding to changes in the pressure of said load, and means responsive to the departure of the pressure sensed by said pressure sensitive means from a predetermined value to change the pressure of said load to return it substantially to its predetermined value.

17. Apparatus for controlling a variable pressure load according to claim 16 in which the variable pressure load includes a pump.

18. Apparatus for controlling a fluid-conveying device comprising a fluid drive which is coupled to said fluid conveying device, pressure-sensitive means electrically interposed between said fluid drive and said load and producing pulses responding to the pressure of the fluid conveyed by said device, and means responsive to the departure of the pressure of the conveyed fluid from a predetermined value for electrically controlling the fluid drive so as to return the pressure of the fluid conveyed by said device substantially to its predetermined value.

19. Apparatus for controlling a fluid conveying device according to claim 18 in which the fluid drive is controlled step by step to return the pressure of the fluid conveyed by the fluid device substantially to its predetermined value.